United States Patent
So

(10) Patent No.: US 6,464,883 B2
(45) Date of Patent: Oct. 15, 2002

(54) REMOVER OF FLUORIDE ION AND TREATMENT METHOD FOR WASTEWATER CONTAINING FLUORIDE ION USING THE SAME

(76) Inventor: Jai-Choon So, Ssangyong Apt. 101-1301, Yongheung-dong, Buk-ku, Pohang-city, Kyunsangbuk-do (KR)

( * ) Notice: Subject to any disclaimer, the term of this patent is extended or adjusted under 35 U.S.C. 154(b) by 0 days.

(21) Appl. No.: 09/873,608

(22) Filed: Jun. 4, 2001

(65) Prior Publication Data

US 2002/0023882 A1 Feb. 28, 2002

(30) Foreign Application Priority Data

Jun. 2, 2000 (KR) .............................................. 00-30429
May 29, 2001 (KR) .............................................. 01-29563

(51) Int. Cl.$^7$ ................................................. C02F 1/52
(52) U.S. Cl. ....................... 210/716; 210/724; 210/754; 210/767; 210/915
(58) Field of Search ................................. 210/716, 723, 210/724, 754, 767, 915

(56) References Cited

U.S. PATENT DOCUMENTS

| 4,008,162 | A | * | 2/1977 | Korenowski et al. |
| 4,045,339 | A | * | 8/1977 | Korenowski et al. |
| 4,171,342 | A | * | 10/1979 | Hirko et al. |
| 4,323,462 | A | * | 4/1982 | Bruckenstein |
| 4,704,265 | A | * | 11/1987 | Krohn et al. |
| 5,043,072 | A | * | 8/1991 | Hitotsuyanagi et al. |
| 5,106,509 | A | * | 4/1992 | Jansen |
| 5,403,495 | A | * | 4/1995 | Kust et al. |
| 5,705,140 | A | * | 1/1998 | Johansing, Jr. |

FOREIGN PATENT DOCUMENTS

| JP | 85-000117 | 1/1985 |
| JP | 62-125894 | 6/1987 |

* cited by examiner

*Primary Examiner*—Betsey Morrison Hoey
(74) *Attorney, Agent, or Firm*—Marshall, Gerstein & Borun

(57) ABSTRACT

The present invention relates to a remover of dissolved fluoride ion for removing fluoride ions contained in wastewater and a treatment method for wastewater containing fluoride using the same. In order to achieve the above objects, the present invention provides a remover of dissolved fluoride ion comprising: a) hydrochloric acid solution reacted with calcium carbonate, and b) a mixture of poly sodium metaphosphate and active aluminum or aqueous solution of mixtures thereof, or an aqueous solution of rare earth element compound, and a treatment method for wastewater containing fluoride using the same. The present invention's removing agent for dissolved fluoride ion and treatment method for wastewater containing fluoride using the same can remove fluoride ion below 10 ppm easily and with low cost, can have the whole of the sludge generated from the treatment process reusable, can greatly reduce the time necessary for wastewater treatment by simplifying the conventional treatment process for wastewater containing fluoride which is complex, and can reduce labor costs as simpler equipment can be used to shorten the process.

16 Claims, 5 Drawing Sheets

REMOVER OF FLUORIDE ION AND TREATMENT METHOD FOR WASTEWATER CONTAINING FLUORIDE ION USING THE SAME

CROSS REFERENCE TO RELATED APPLICATION

This application is based on application No. 10-2000-30429 and No. 10-2001-29563 filed in the Korean Industrial Property Office on Jun. 2, 2000, and May 29, 2001 respectively, the content of which is incorporated hereinto by reference.

BACKGROUND OF THE INVENTION

1. Field of the Invention

The present invention relates to a remover of dissolved fluoride ion for removing fluoride ions contained in wastewater and a treatment method for wastewater containing fluoride ions using the same. More particularly, the present invention relates to a new treatment method, wherein not only a very small amount of fluoride ion can be efficiently removed but also the whole of the sludge generated from the process can be reused by adding calcium carbonate as main material, poly sodium phosphate, and active aluminum to form a very stable precipitate.

2. Description of the Related Art

The usual treatment method for wastewater containing fluoride ion, which is generated from all kinds of semiconductor manufactories, electrolyzing and refining aluminum factories, metal surface-treating factories, print-substrate manufactories, and ceramic manufactories, has been where fluoride ion is made to be an insoluble material by adding at least one or more compounds selected from a group composed of calcium compound, aluminum compound, and phosphorus compound to the wastewater containing fluoride, and then removing the insoluble materials by a solid-liquid separation.

The representative method among the above methods is disclosed in Japanese Patent Publication Number Showha 60-117 using a combination of aluminum compound as aluminum sulfate and calcium compound as calcium hydroxide, and in Japanese Patent Publication Number Showha 62-125894 using a combination calcium compound such as calcium chloride and phosphorus compound such as potassium phosphate.

For example, in a semiconductor manufactory where the treatment method involves wastewater containing fluoride of 300~600 ppm collected into a water-collection tank, the pH in $1^{st}$ reaction tank is controlled to be about 10 by adding calcium hydroxide, a small amount of iron chloride(III) ($CaCl_2$) as a support flocculent is added to $2^{nd}$ reaction tank, the fluoride concentration is brought down to 30~60 ppm by adding a polymer flocculent in $3^{rd}$ reaction tank to change the fluorides to calcium fluoride which is removed by precipitation-separating in $1^{st}$ precipitation tank. Furthermore, the filtrate is transported to $1^{st}$ precipitation-reaction tank and injected with poly aluminum chloride (PAC) of about 600 ppm, pH in $2^{nd}$ precipitation-reaction tank is controlled between 6.7~7.0 with sodium hydroxide input. After then, the fluoride concentration is brought down to a level of below 10 ppm by adding polymer flocculent in $3^{rd}$ precipitation-reaction tank, and the residual fluoride is removed by precipitation-separating in $2^{nd}$ precipitation tank, as shown in the process diagram of FIG. 1.

However, the method is very complex because the fluoride treatment method involves a 2-step process that should perform filtration-separation twice. Furthermore, it is very difficult to operate, handle and maintain the equipment of performing precipitation and filtration twice, requiring a lengthy time, and more important is the fact that there is much difficulty in treating the large amount of sludge generated from the wastewater treatment process.

SUMMARY OF THE INVENTION

The object of the present invention is to consider the problems of the prior art, and to provide an improved removing agent of dissolved fluoride ion that is able to selectively remove fluoride ions to result in a low concentration of wastewater containing fluoride ion by only a one-step treatment, regardless of the initial concentration and treatment methods for wastewater comprising fluoride using the same.

In order to achieve the above objects, the present invention provides a remover of dissolved fluoride ions comprising:

a) hydrochloric acid solution reacted with calcium carbonate.

Furthermore, the remover of dissolved fluoride ion can also comprise:

b) a mixture of poly sodium metaphosphate and active aluminum or aqueous solution of mixtures thereof, or an aqueous solution of rare earth element.

The present invention also provides a treatment method for wastewater containing fluorides comprising the step of:

a) adding hydrochloric acid solution reacted with calcium carbonate to the wastewater containing fluorides.

Furthermore, the treatment method for wastewater containing fluoride can also comprise the following step of:

b) controlling pH of the wastewater above pH 5.0 by adding alkali solution to the wastewater of a) step.

Furthermore, the treatment method for wastewater containing fluoride can also comprise the following step of:

c) adding a mixture of poly sodium metaphosphate and active aluminum or aqueous solution of mixtures thereof, or an aqueous solution of rare earth element to the waste water of b) step until the pH of wastewater is 4.0~10.0, and then adding the prescribed polymer flocculent.

Furthermore, the treatment method for the wastewater containing fluoride can also comprise the following step of:

d) separating the generated sludge from a) step through to c) step from the mixed solid-liquid phase, and then discharging the wastewater of liquid phase.

Furthermore, the treatment method for wastewater containing fluoride can also comprise the following step of:

e) reusing the separated solid sludge of d) step as a material for cement.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

Figure 1:
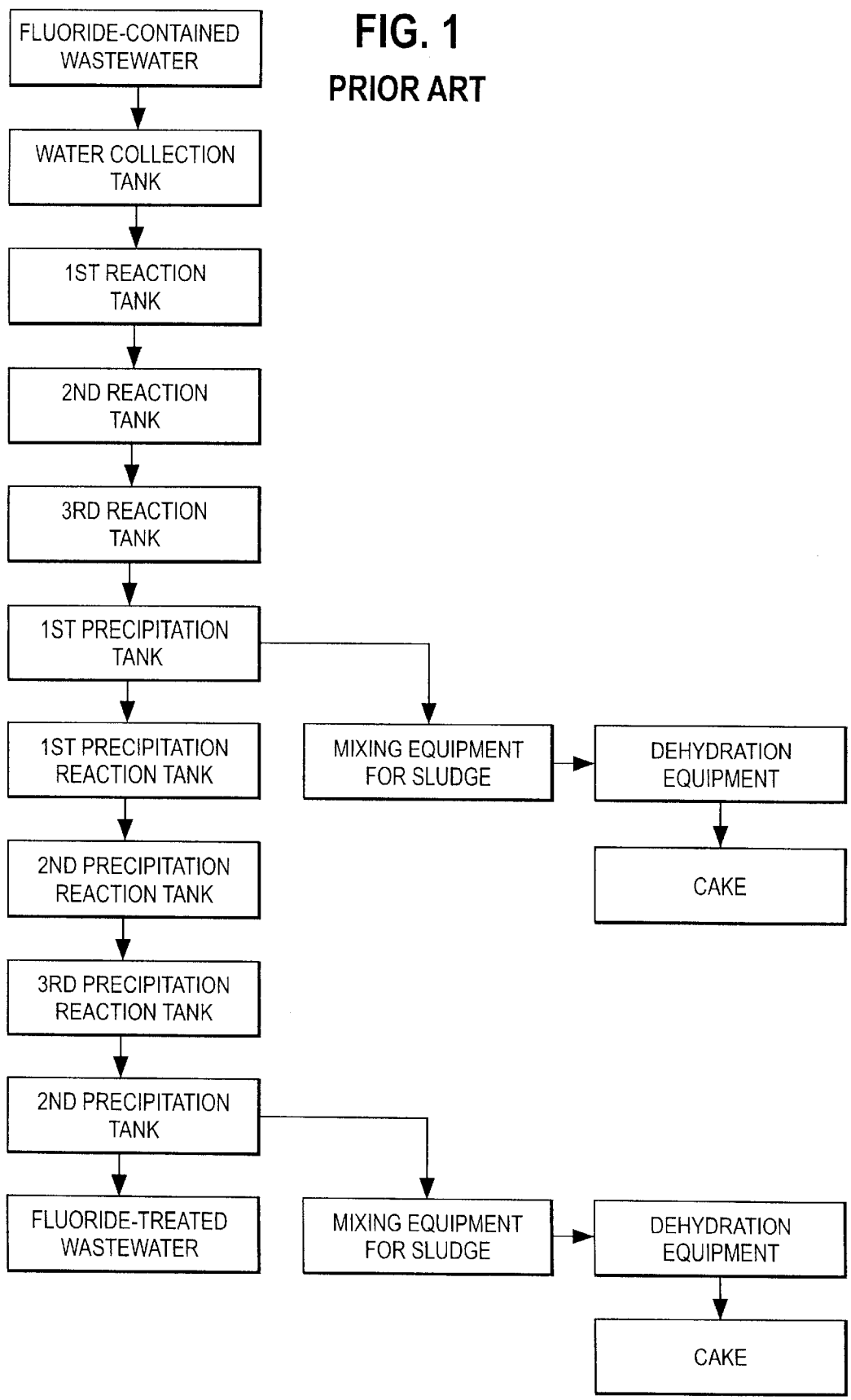
FIG. 1 is a process diagram showing the usual fluoride treatment method for wastewater containing fluoride.

Reference numeral (1) indicates wastewater containing fluoride, (2) hydrochloric acid solution reacted with calcium carbonate, (3) sodium hydroxide, (4) a mixture of poly sodium metaphosphate and active aluminum or aqueous solution of mixtures thereof, or an aqueous solution of rare earth element, (5) a polymer flocculent, (6) treated wastewater, (7) a water collection tank, (8) a precipitation tank, (10) $1^{st}$ reaction tank, (20) $2^{nd}$ reaction tank, and (30) $3^{rd}$ reaction tank.

DETAILED DESCRIPTION AND THE PREFERRED EMBODIMENTS

In the following detailed description, only the preferred embodiment of the invention has been shown and described, simply by way of illustration of the best mode contemplated by the inventors of carrying out the invention. As will be realized, this invention is capable of modification in various obvious respects, all without departing from its object. Accordingly, the drawings and description are to be regarded as illustrative in nature, and not restrictive.

The present invention will now be explained in more detail.

Figure 2:
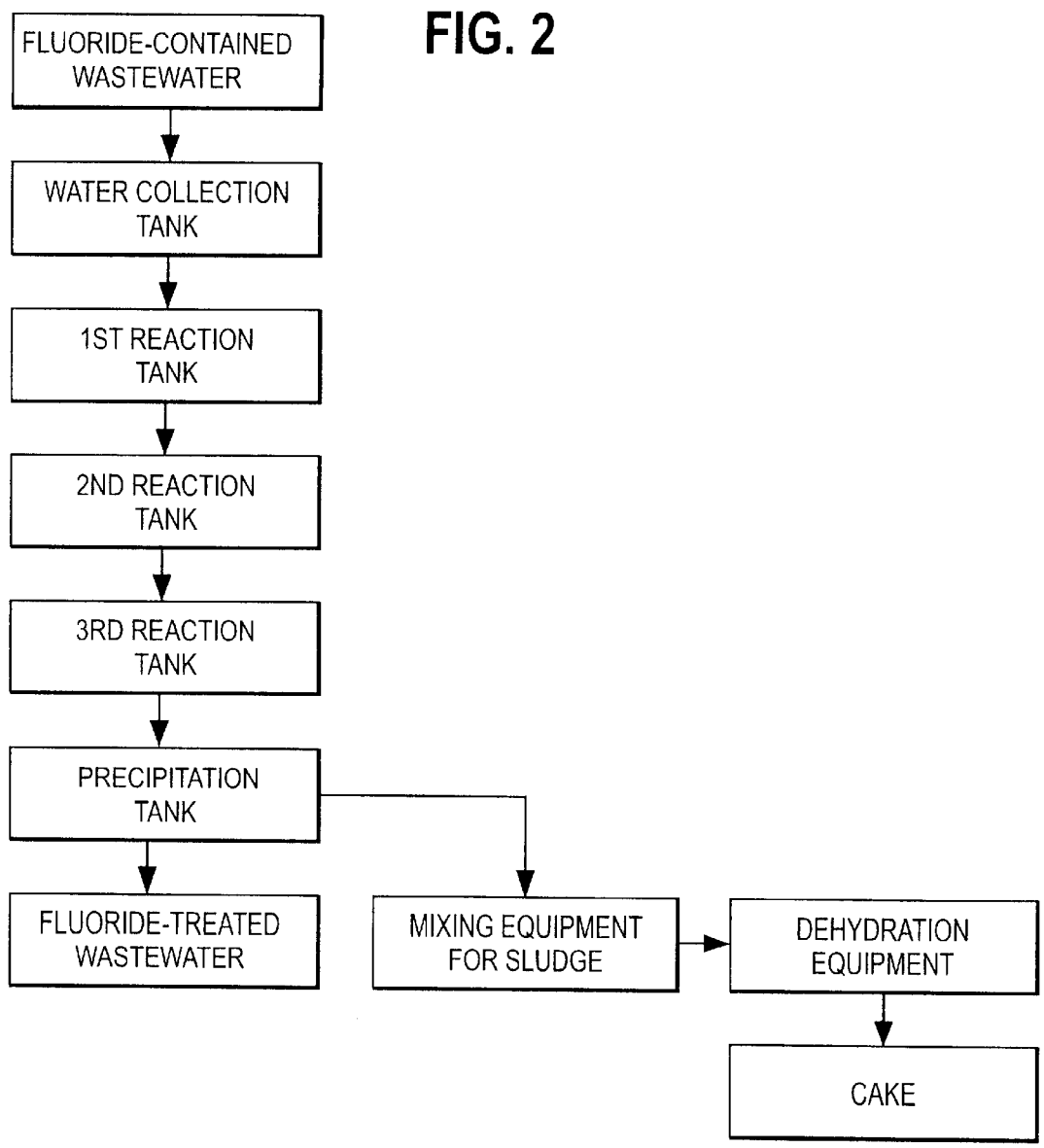
FIG. 2 is a process diagram showing the fluoride treatment method of this invention for wastewater containing fluoride.

The treatment process for wastewater containing fluoride according to the present invention, as shown in FIG. 2, involves first a designated quantity of hydrochloric acid solution reacted with calcium carbonate, in which the main material is calcite. This solution is added to wastewater containing a high concentration of fluoride collected to the collection tank in $1^{st}$ reaction tank, which brings about the precipitation of fluoride ions into insoluble materials ($CaF_2$) according to the following Reaction Formula 1 by controlling the pH over 8.0 by adding alkali solution as sodium hydroxide, wherein the residual fluoride concentration is 30~60 ppm.

[Reaction Formula 1]

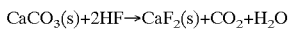

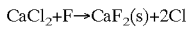

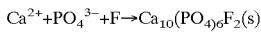

To perform the above process, it is preferable that the hydrochloric acid solution reacted with calcium carbonate prepared by mixing and reacting:

i) aqueous hydrochloric acid solution having concentration of more than 5 wt %; and ii) 10 to 95 wt % of calcium carbonate.

At this point, it is preferable to add 100~100,000 ppm of hydrochloric acid solution reacted with calcium carbonate prepared by mixing and reacting aqueous hydrochloric acid solution having concentration of more than 5 wt % and 10 to 95 wt % of calcium carbonate against 100 ppm of fluoride ion contained in wastewater.

However, it is impossible for the above process to remove fluoride ion residue below 10 ppm, due to the solubility of the insoluble materials ($CaF_2$).

Therefore, by flowing the above $1^{st}$ treated wastewater to $2^{nd}$ reaction tank, and adding an aqueous solution comprising poly sodium metaphosphate and active aluminum compound until the pH of wastewater reaches between 4.0~10.0, preferably 6.0~7.0, after controlling pH of wastewater by adding alkali solution such as NaOH over 5.0, preferably over 8.0, a small amount of fluoride ion even down to below 10 ppm which is remained unremoved through $1^{st}$ reaction tank can be easily removed to form a very stable precipitation ($NaPO_3AlF_3$) as shown in Reaction Formula 2.

[Reaction Formula 2]

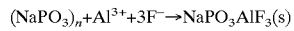

To perform the above process, it is preferable to use the mixture of poly sodium metaphosphate and active aluminum compound or aqueous solution of mixtures thereof comprising:

iii) less than 1 wt % of poly sodium metaphosphate; and iv) more than 5 wt % of active aluminum compound.

Furthermore, it is preferable for the active aluminum compound to be selected from a group composed of aluminum chloride, aluminum sulfate, poly aluminum chloride, and poly aluminum sulfate.

In addition, the present invention can use a compound of rare earth element such as La or Ce as a main material of, instead of the mixture of poly sodium metaphosphate and active aluminum compound or aqueous solution of mixtures thereof. At this point, it is preferable to use Cerium (Ce), or Lanthan (La), or mixture thereof, as rare earth element. Therefore, it is preferable to use the aqueous solution of rare earth element comprising: v) 5~60 wt % of compound of a rare earth element.

In $3^{rd}$ reaction tank, by adding a polymer flocculent suitable to the characteristics of precipitation particles that are generated in $1^{st}$ and $2^{nd}$ reaction tank, the solid-liquid separation of the precipitation tank is performed easily through making the precipitating particles larger. Preferable polymer flocculent is conventional, and polyacrylamide is representative.

At this point, a large amount of the sludge generated in solid-liquid separation of the precipitation tank can be completely reused as a material for cement as their main component is unreacted calcium carbonate with a small amount of calcium fluoride from the reacted with fluoride ion and silicon compound contained in semiconductor wastewater.

Figure 3:
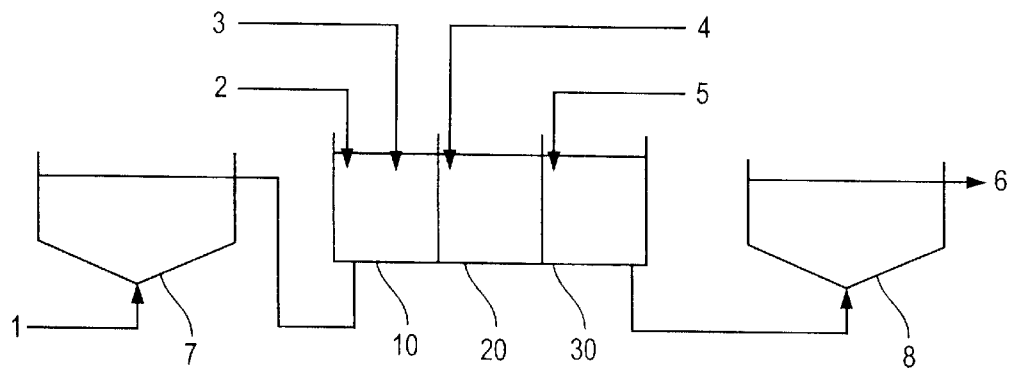
FIG. 3 is a schematic representation showing this invention's treatment stages according to each reaction tank for wastewater containing fluoride.
Figure 4:
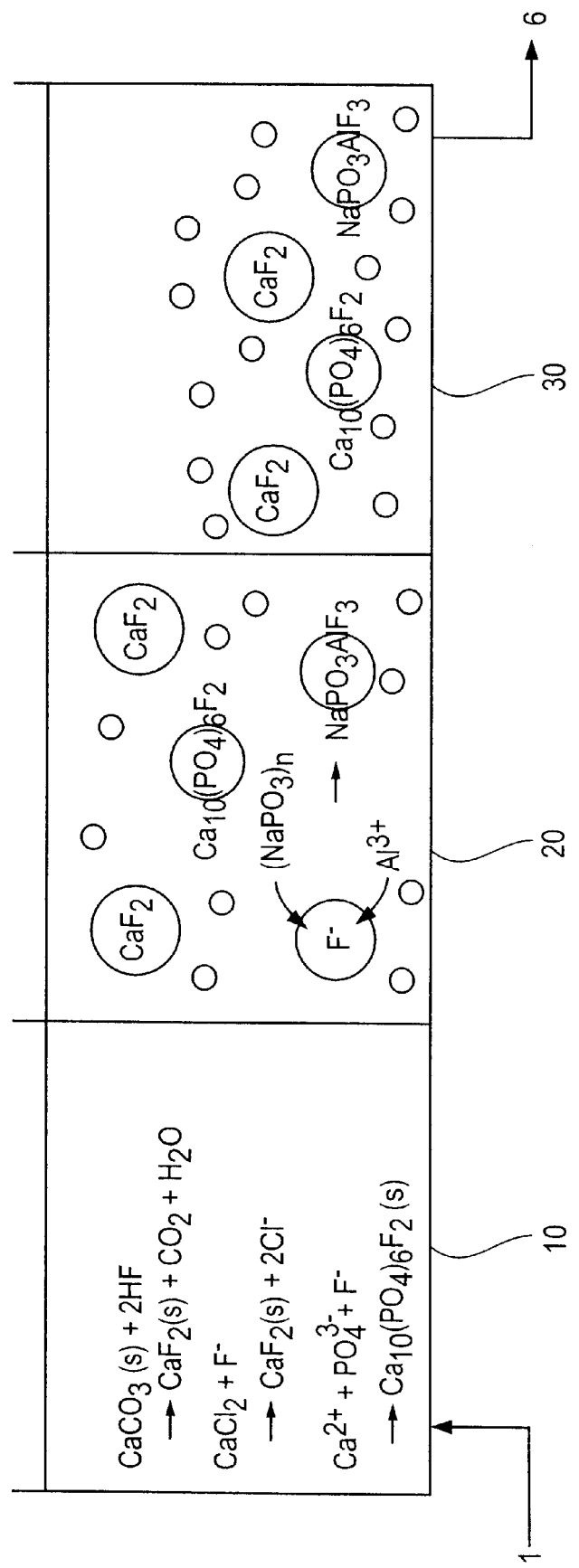
FIG. 4 is a schematic representation showing the reaction mechanism of each reaction tank for wastewater containing fluoride.

FIG. 3 and FIG. 4 is a schematic representation showing this invention's treatment process and reaction mechanism according to each reaction tank.

The present invention is described in detail through the following EXAMPLES and COMPARATIVE EXAMPLES. However, these EXAMPLES are for illustrating the present invention and not for limiting the present invention.

EXAMPLE

Examples 1~6, Comparative Examples 1~6

Fluoride treatment agent according to this invention was composed of two kinds of solutions. After the hydrochloric acid solution reacted with calcium carbonate was prepared, wherein the content of calcium carbonate was 5, 8, 10, and 15 wt % and the concentration of hydrochloric acid was 0.0, 5.0, 10.0%, each solution was added at the amount of 10,000 ppm to semiconductor wastewater containing fluoride ion of 400 ppm, the pH was controlled over 8.0 by adding sodium hydroxide solution, and each solution was stirred and precipitated. The result of the efficiency of removing fluoride is shown in Table 1.

TABLE 1

The measurement result of removing fluoride according to the contents uz,8/37 of calcium carbonate and hydrochloric acid

| | Lime solution | | | Wastewater containing fluoride | | |
|---|---|---|---|---|---|---|
| Classification | Concentration of hydrochloric acid (wt %) | Calcium carbonate (wt %) | Injection content (ppm) | Concentration before treatment | Concentration after treatment | Treatment efficiency (%) |
| Comparative example 1 | 0 | 5 | 10000 | 400 | 320 | 20.0 |
| Comparative example 2 | 0 | 8 | 10000 | 400 | 312 | 24.5 |
| Comparative example 3 | 0 | 10 | 10000 | 400 | 307 | 23.3 |
| Comparative example 4 | 0 | 15 | 10000 | 400 | 305 | 23.8 |
| Comparative example 5 | 5 | 5 | 10000 | 400 | 180 | 55.0 |
| Comparative example 6 | 5 | 8 | 10000 | 400 | 158 | 60.5 |
| Example 1 | 5 | 10 | 10000 | 400 | 90 | 77.5 |
| Example 2 | 5 | 15 | 10000 | 400 | 88 | 78.0 |
| Example 3 | 10 | 5 | 10000 | 400 | 110 | 72.5 |
| Example 4 | 10 | 8 | 10000 | 400 | 82 | 79.5 |
| Example 5 | 10 | 10 | 10000 | 400 | 63 | 84.3 |
| Example 6 | 10 | 15 | 10000 | 400 | 41 | 84.8 |

As seen in the above results, when hydrochloric acid was not added to calcium carbonate as main material in the fluoride treatment agent, the treatment efficiency was within and without 20%, because the calcium carbonate is only made to react with fluoride to form a precipitate and to be removed according to the following Reaction Formula 3, of which method could not be applied. However, when hydrochloric acid was added above 5 wt %, the treatment efficiency was improved until 80%, because same part of calcium carbonate is dissolved to hydrochloric acid to be changed to calcium ion, and it can be reacted easily with fluoride ion.

[Reaction Formula 3]

$$CaCO_3(s) + 2HF \rightarrow CaF_2(s) + CO_2 + H_2O$$

Examples 7~12

To achieve the appropriate pH condition and the treatment efficiency for removing fluoride according to pH variations in performing the treatment of fluoride contained in wastewater using the hydrochloric solution reacted with calcium carbonate among the many fluoride-removers of the present invention, hydrochloric acid solutions reacted with calcium carbonate as a fluoride-treatment agent were prepared, wherein the content of calcium carbonate was 20 wt % and the concentration of hydrochloric acid is 10.0%.

10,000 ppm of the above solution was added to semiconductor wastewater containing fluoride ion of 400 ppm, the pH being controlled at 5.0, 6.0, 7.0, 8.0, 9.0, and 10.0 respectively by adding sodium hydroxide solution, and each solution was stirred and precipitated. The result of the efficiency for removing fluoride is shown in Table 2.

TABLE 2

The measurement result of fluoride treatment efficiency according to pH condition variations

| | Lime solution | | | PH by adding sodium hydroxide | Wastewater containing fluoride | | |
|---|---|---|---|---|---|---|---|
| Classification | Con. of hydrochloric acid (wt %) | Calcium carbonate (wt %) | Injection rate (ppm) | | Con. before treatment | Con. after treatment | Treatment efficiency (%) |
| Example 7 | 10 | 20 | 10000 | 5.0 | 400 | 9.8 | 78.0 |
| Example 8 | 10 | 20 | 10000 | 6.0 | 400 | 81 | 79.8 |
| Example 9 | 10 | 20 | 10000 | 7.0 | 400 | 68 | 83.0 |
| Example 10 | 10 | 20 | 10000 | 8.0 | 400 | 36 | 91.0 |
| Example 11 | 10 | 20 | 10000 | 9.0 | 400 | 33 | 91.8 |
| Example 12 | 10 | 20 | 10000 | 10.0 | 400 | 31 | 92.3 |

As shown in Table 2, when the wastewater containing fluorides was treated with a hydrochloric solution reacted with calcium carbonate as a main material, the fluoride treatment efficiency below pH 7 was relatively low, and the fluoride treatment efficiency above pH 8 was above 90%.

Therefore, in this treatment process of the present invention using hydrochloric acid solution reacted with calcium carbonate of the present invention, it is preferable to promote a precipitation reaction by controlling pH over 8.0 of pH using sodium hydroxide after injecting the agent. This is the pH condition which is the most stable precipitate to be formed when calcium ion and fluoride ion are reacted with each other, giving a higher efficiency in removing fluoride according to the results.

Examples 13~48

In preparing a solution of mixtures of poly sodium metaphosphate and active aluminum compound as another fluoride-treatment agent of the present invention, aqueous solutions were prepared respectively by adding poly sodium metaphosphate of which content were 0.0, 0.5, 1.0, and 1.5 wt % with the active aluminum compounds of 5, 10, and 15 wt % added.

After preparing the mixture solutions, 10,000 ppm of the hydrochloric acid solution reacted with calcium carbonate, wherein hydrochloric acid concentration was 10 wt % and the calcium carbonate's content was 20 wt %, was added to semiconductor wastewater containing fluoride ion of 400 ppm, the pH being controlled over 8.0 by adding sodium hydroxide solution. And then the prepared solution of mixtures of poly sodium metaphosphate and active aluminum compound (aluminum chloride, aluminum sulfate, or poly aluminum chloride) was injected until the pH of wastewater reached 6~7, and a polymer flocculent (poly acrylamide) was added, while each solution was stirred and precipitated. The result of the efficiency for removing fluoride is shown in Table 3.

In the test results, when the content of active aluminum compound was over 5 wt % in the solution of mixtures of poly sodium metaphosphate and active aluminum compound, fluoride ion could be removed until the concentration of fluoride ion was below 15 ppm by changing the injection rate. However, when the content of active aluminum compound was below 5 wt %, a large amount of solution of mixtures of poly sodium metaphosphate and active aluminum compound was needed to bring the concentration of fluoride ion down 15 ppm.

Furthermore, when the content of active aluminum is the same, the more the content of poly sodium metaphosphate went up, the more the efficiency of removing fluoride increased. Additionally, when the concentration of poly sodium metaphosphate was over 1 wt %, the efficiency of removing fluoride did not increase greatly in proportion to the agent's cost, so it is not preferable in view of economics.

Therefore, this present invention limited the concentrations of components in the solution of mixtures of poly sodium metaphophate and active aluminum compound so that the active aluminum compound content is more than 5 wt % and the poly sodium metaphosphate's content as less than 1 wt %.

Examples 49~52

In grasping the possibility of usage of the rare earth element of which the main material is La and Ce, instead of

TABLE 3

| classification | mixture solution | | | | wastewater containing fluoride | | |
| --- | --- | --- | --- | --- | --- | --- | --- |
| | Poly sodium meta phospate | active aluminum (wt %) | | | Con. before treatment (ppm) | Con. after treatment (ppm) | treatment efficiency (%) |
| | | aluminum chloride | poly aluminum chloride | aluminum sulfate | | | |
| Example 13 | 0 | 5 | 0 | 0 | 400 | 22.8 | 94.3 |
| Example 14 | 0 | 10 | 0 | 0 | 400 | 14.0 | 96.5 |
| Example 15 | 0 | 15 | 0 | 0 | 400 | 8.2 | 98.0 |
| Example 16 | 0 | 0 | 5 | 0 | 400 | 19.6 | 95.1 |
| Example 17 | 0 | 0 | 10 | 0 | 400 | 12.9 | 95.3 |
| Example 18 | 0 | 0 | 15 | 0 | 400 | 10.0 | 97.5 |
| Example 19 | 0 | 0 | 0 | 5 | 400 | 31.6 | 92.1 |
| Example 20 | 0 | 0 | 0 | 10 | 400 | 20.8 | 94.8 |
| Example 21 | 0 | 0 | 0 | 15 | 400 | 14.8 | 95.8 |
| Example 22 | 0.5 | 5 | 0 | 0 | 400 | 18.4 | 95.4 |
| Example 23 | 0.5 | 10 | 0 | 0 | 400 | 11.3 | 97.2 |
| Example 24 | 0.5 | 15 | 0 | 0 | 400 | 6.7 | 98.3 |
| Example 25 | 0.5 | 0 | 5 | 0 | 400 | 17.1 | 95.7 |
| Example 26 | 0.5 | 0 | 10 | 0 | 400 | 10.3 | 97.4 |
| Example 27 | 0.5 | 0 | 15 | 0 | 400 | 8.8 | 97.8 |
| Example 28 | 0.5 | 0 | 0 | 5 | 400 | 27.4 | 93.2 |
| Example 29 | 0.5 | 0 | 0 | 10 | 400 | 16.5 | 95.9 |
| Example 30 | 0.5 | 0 | 0 | 15 | 400 | 12.0 | 97.0 |
| Example 31 | 1.0 | 5 | 0 | 0 | 400 | 15.7 | 96.1 |
| Example 32 | 1.0 | 10 | 0 | 0 | 400 | 9.5 | 97.6 |
| Example 33 | 1.0 | 15 | 0 | 0 | 400 | 5.1 | 98.7 |
| Example 34 | 1.0 | 0 | 5 | 0 | 400 | 14.9 | 95.8 |
| Example 35 | 1.0 | 0 | 10 | 0 | 400 | 8.3 | 97.9 |
| Example 36 | 1.0 | 0 | 15 | 0 | 400 | 6.0 | 98.5 |
| Example 37 | 1.0 | 0 | 0 | 5 | 400 | 22.9 | 94.3 |
| Example 38 | 1.0 | 0 | 0 | 10 | 400 | 14.0 | 96.5 |
| Example 39 | 1.0 | 0 | 0 | 15 | 400 | 9.6 | 97.6 |
| Example 40 | 1.5 | 5 | 0 | 0 | 400 | 15.0 | 96.3 |
| Example 41 | 1.5 | 10 | 0 | 0 | 400 | 9.2 | 97.7 |
| Example 42 | 1.5 | 15 | 0 | 0 | 400 | 4.9 | 98.8 |
| Example 43 | 1.5 | 0 | 5 | 0 | 400 | 15.1 | 96.2 |
| Example 44 | 1.5 | 0 | 10 | 0 | 400 | 8.1 | 98.0 |
| Example 45 | 1.5 | 0 | 15 | 0 | 400 | 6.2 | 98.5 |
| Example 46 | 1.5 | 0 | 0 | 5 | 400 | 22.5 | 94.4 |
| Example 47 | 1.5 | 0 | 0 | 10 | 400 | 13.6 | 95.6 |
| Example 48 | 1.5 | 0 | 0 | 15 | 400 | 8.3 | 97.9 | the solution of mixtures of poly sodium metaphophate and active aluminum compound, an aqueous rare earth element compound solution as a fluoride treatment agent was prepared, wherein the content of La and Ce is 5, 10, and 15 wt % respectively.

In the wastewater treatment process, to confirm the possibility of use of the above aqueous solution of rare earth element compound, 10,000 ppm of the hydrochloric acid solution reacted with calcium carbonate, wherein hydrochloric acid concentration was 10 wt % and the calcium carbonate's content was 20 wt %, was added to semiconductor wastewater containing fluoride ion of 400 ppm, the pH was controlled with over 8.0 by adding sodium hydroxide solution, the new prepared aqueous earth element compound solution was injected until the pH of wastewater reached 6~7, and a polymer flocculent was added, while each solution was stirred and precipitated. The result of the efficiency for removing fluoride is shown in Table 4.

TABLE 4

Treatment result of fluoride-wastewater using a solution comprising a rare earth element as a main material

| Classification | Content of rare earth element (La + Ce) in solution (wt %) | Wastewater containing fluoride | | |
|---|---|---|---|---|
| | | Concentration before treatment (ppm) | Concentration after treatment (ppm) | Treatment efficiency (%) |
| Example 49 | 5 | 400 | 36.7 | 90.8 |
| Example 50 | 10 | 400 | 14.8 | 96.3 |
| Example 51 | 15 | 400 | 7.6 | 98.1 |
| Example 52 | 20 | 400 | 3.8 | 99.1 |

The fluoride treatment method using a solution where the main material was a rare earth element resulted in having superior performance and efficiency so that the content of the rare earth element over 20 wt % could treat an infinitesimal quantity of fluoride.

Therefore, it is found that a solution where the main material was La and Ce can be applied to the treatment process for semiconductor wastewater instead of a solution of mixtures of poly sodium metaphosphate and active aluminum compound.

Examples 53

To test for the injection ratio of the agent and the efficiency of removing fluorides based on the above Examples by applying the fluoride treatment agent having the most suitable concentration condition to the practical-treatment process for semiconductor wastewater, the hydro chloric acid solution reacted with calcium carbonate having the calcium carbonate content of 40 wt % was prepared, and the solution of mixtures of 0.5 wt % poly sodium metaphosphate and 50 wt % active aluminum compound having aluminum chloride ($AlCl_3 \cdot 6H_2O$) was prepared.

TABLE 5

Component analysis result for original semiconductor wastewater

| Classification | F | Si | Mg | Na | K | Sn | $NO_3$ | $SO_4$ | $PO_4$ |
|---|---|---|---|---|---|---|---|---|---|
| Original wastewater (ppm) | 541 | 32.68 | 0.48 | 8.86 | 8.88 | 1.97 | 61 | 448 | 115 |

The above fluoride treatment agents were added to 100 ml of the semiconductor wastewater having the composition of Table 5, wherein 1.295 g of the hydrochloric acid reacted with calcium carbonate was added, while the precipitation reaction of calcium ion and fluoride ion activated by controlling the pH at 8.0 through NaOH input. Again pH was controlled to 6.5 by adding 0.1266 g of the solution of mixtures of poly sodium metaphosphate and active aluminum compound, and the reacted and generated precipitates are made larger particles and precipitated by adding a suitable amount of polymer flocculent, and the fluoride concentration of the remained wastewater was measured as shown in the following Table 6.

TABLE 6

| Classification | Fluoride concentration of original wastewater (ppm) | Injection content of fluoride treatment agent (g) | | Fluoride concentration of treated wastewater (ppm) | Generated sludge quantity (g) |
|---|---|---|---|---|---|
| | | Hydrochloric acid solution reacted with calcium carbonate | Mixture solution of poly sodium meta phosphate and aluminum chloride | | |
| Result | 541 | 1.295 | 0.1266 | 9.8 | 0.3437 |

As shown in Table 6, the test results of fluoride wastewater treatment after the preparation of the fluoride treatment agents according to the most suitable concentration condition selected showed that the present invention's fluoride wastewater treatment using the new fluoride treatment agent and the treatment process can remove fluoride ion below 10 ppm by only a one-step treatment process.

Figure 5:
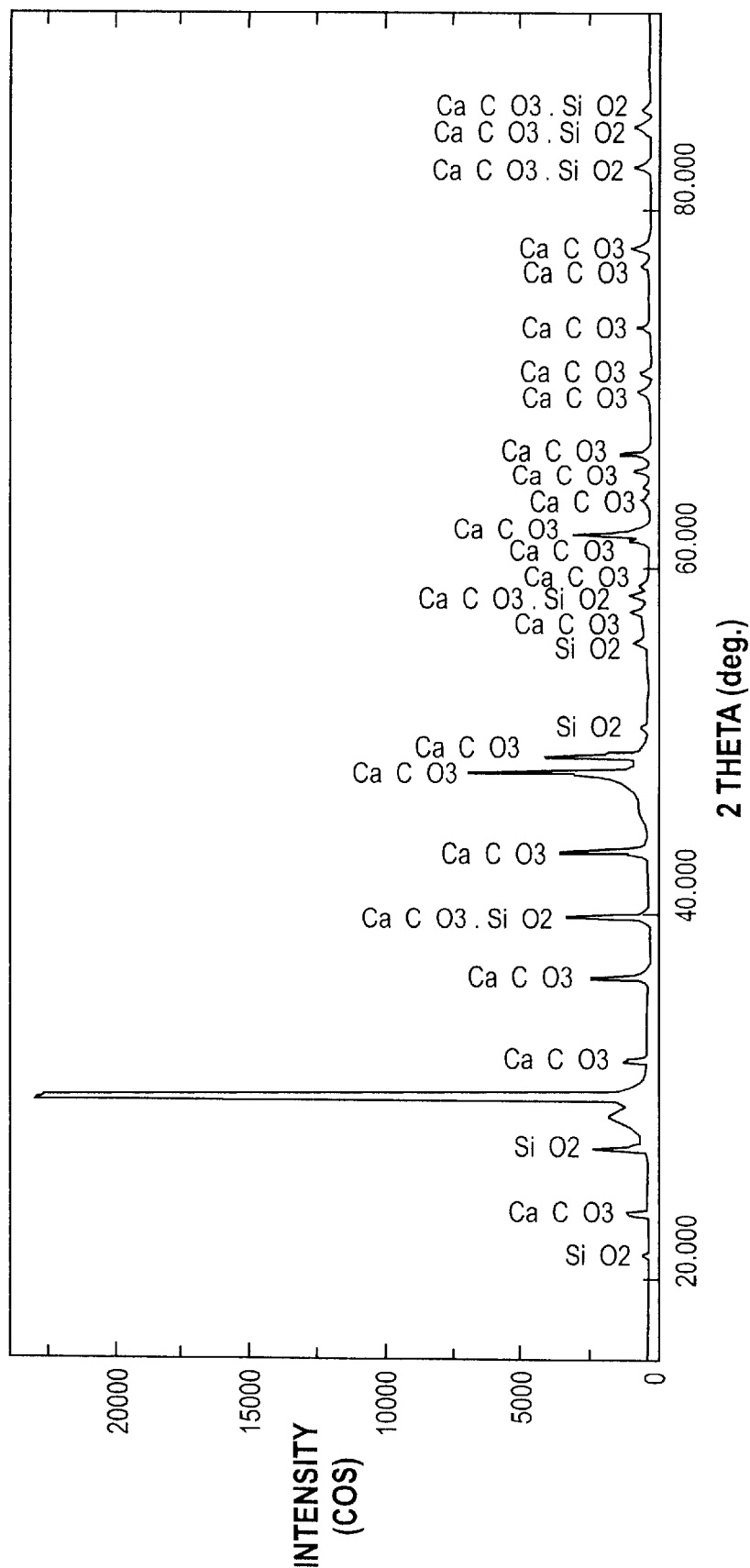
FIG. 5 is a result of X-ray diffraction analysis for the generated sludge of Example 53.
Figure 6:
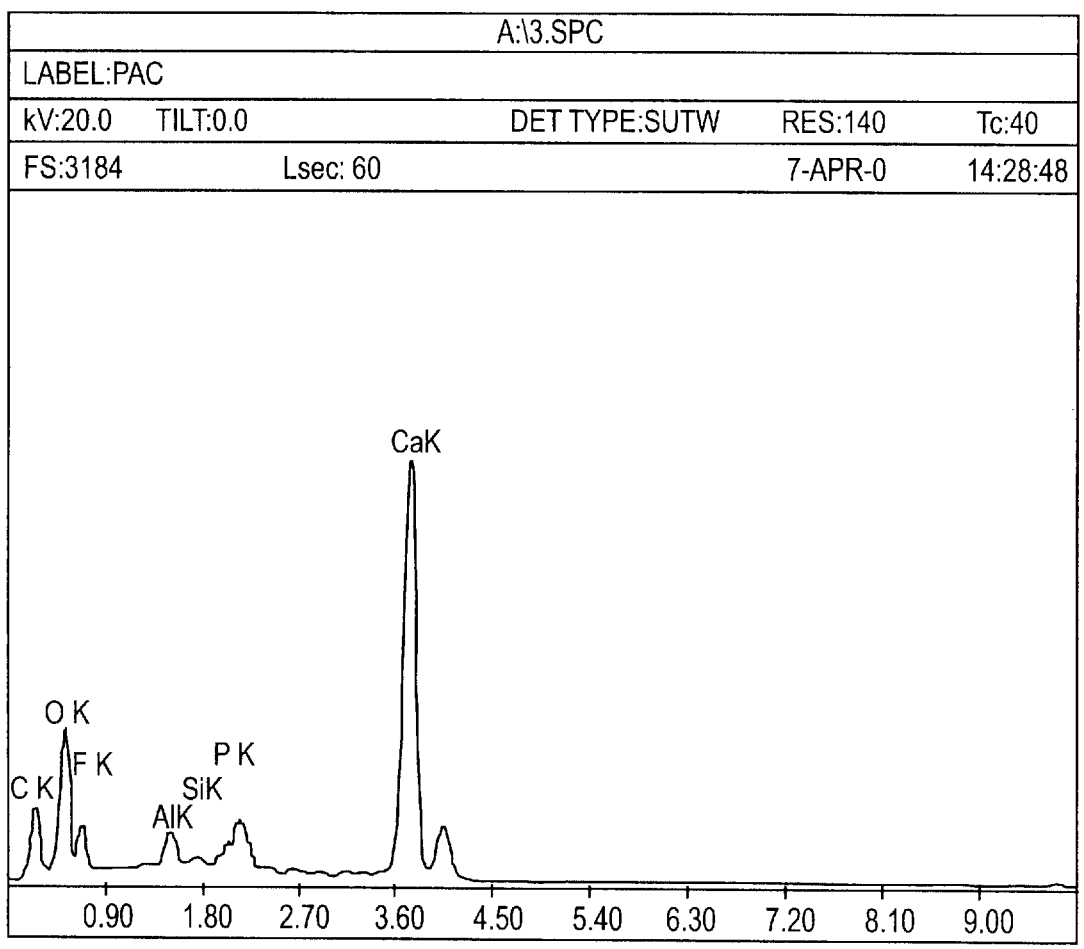
FIG. 6 is a result of EPMA analysis for the generated sludge of Example 53.

Furthermore, FIG. 5 and FIG. 6 show respectively a quantitative analysis results using EPMA (electron probe micro analysis) and a structural analysis using X-ray diffraction analysis for the filtrated and dried sludge to confirm a possibility of reusing the sludge generated from the wastewater treatment process.

According to the results, the sludge comprised unreacted calcium carbonate as a main material and small amount of $SiO_2$, $CaF_2$, and $NaPO_3AlF_3$, therefore it is found that the sludge can be reused as a material for cement with no problems.

Therefore the present invention has an effect in resolving the sludge problems that the conventional treatment process for wastewater containing fluoride has not been able to resolve.

The present invention is made in consideration of the problems of the prior art, and it is an object of the present invention to provide an improved remover of dissolved fluoride ion to be able to remove selectively fluoride ion of very low concentration by a one-step treatment for fluoride ion contained wastewater regardless of the initial concentration and treatment method for wastewater comprising fluoride using the same.

The present invention's removing agent for dissolved fluoride ion and treatment method for wastewater containing fluoride using the same can remove fluoride ion below 10 ppm easily and with low cost, can have the whole of the sludge generated from the treatment process reusable, can greatly reduce the time necessary for wastewater treatment by simplifying the conventional treatment process for wastewater containing fluoride which is complex, and can reduce labor costs as simpler equipment can be used to shorten the process.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A remover of dissolved fluoride ion comprising:
   an aqueous hydrochloric acid solution reacted with calcium carbonate; and
   a mixture of poly sodium metaphosphate and an active aluminum compound or an aqueous solution of mixtures thereof, or an aqueous solution of a rare earth element.

2. The remover of dissolved fluoride ion of claim 1, wherein the aqueous hydrochloric acid solution reacted with calcium carbonate is prepared by mixing and reacting;
   i) an aqueous hydrochloric acid solution having a hydrochloric acid concentration of more than 5 wt %; and
   ii) 10 wt % to 95 wt % of calcium carbonate.

3. The remover of dissolved fluoride ion of claim 1, wherein the mixture of poly sodium metaphosphate and an active aluminum compound or an aqueous solution of mixtures thereof of b) comprises:
   iii) less than 1 wt % of poly sodium metaphosphate; and
   iv) more than 5 wt % of an active aluminum compound.

4. The remover of dissolved fluoride ion of claim 1, wherein the aqueous solution of a rare earth element comprises:
   v) 5 wt % to 60 wt % of a rare earth element compound.

5. The remover of dissolved fluoride ion of claim 1, wherein the active aluminum compound of b) is selected from the group consisting of aluminum chloride, aluminum sulfate, poly aluminum chloride, and poly aluminum sulfate.

6. The remover of dissolved fluoride ion of claim 1, wherein the rare earth element compound is cerium (Ce), lanthanum (La), or a mixture thereof.

7. A treatment method for fluoride-containing wastewater comprising the steps of:
   a) adding a hydrochloric acid solution reacted with calcium carbonate to the fluoride-containing wastewater;
   b) maintaining the pH of the wastewater above 5.0 by adding an alkali solution to the wastewater of step a); and
   c) adding a mixture of poly sodium metaphosphate and an active aluminum or an aqueous solution of mixtures thereof, or an aqueous solution of a rare earth element to the waste water of step b) until the pH of wastewater is 4.0~10.0, and then adding a polymer flocculent.

8. The treatment method of claim 7, comprising the step of adding a mixture of poly sodium metaphosphate and an active aluminum or an aqueous solution of mixtures thereof, or an aqueous solution of a rare earth element until the pH of the wastewater is 6.0~7.0.

9. The treatment method of claim 7, further comprising the step of:
   d) separating a solid sludge generated in steps a) through c) from a mixed solid-liquid phase, and then discharging the wastewater of the liquid phase.

10. The treatment method of claim 9, further comprising the step of:
    e) reusing the separated solid sludge of step d) as a material for cement.

11. The treatment method of claim 7, wherein the aqueous hydrochloric acid solution reacted with calcium carbonate of step a) is prepared by mixing and reacting;
    i) an aqueous hydrochloric acid solution having a hydrochloric acid concentration of more than 5 wt %; and
    ii) 10 wt % to 95 wt % of calcium carbonate.

12. The treatment method of claim 7, wherein the mixture of poly sodium metaphosphate and an active aluminum compound or the aqueous solution of mixtures thereof of step c) comprises:
    iii) less than 1 wt % of poly sodium metaphosphate; and
    iv) more than 5 wt % of an active aluminum compound.

13. The treatment method of claim 7, wherein the aqueous solution of a rare earth element of step c) comprises:
    v) 5 wt % to 60 wt % of a rare earth element compound.

14. The treatment method of claim 7, wherein the active aluminum compound of step b) is selected from the group consisting of aluminum chloride, aluminum sulfate, poly aluminum chloride, and poly aluminum sulfate.

15. The treatment method of claim 7, wherein the rare earth element compound of step c) is cerium (Ce), lanthanum (La), or a mixture thereof.

16. The treatment method of claim 7, wherein the addition of step a) comprises adding 100 ppm ~100,000 ppm of hydrochloric acid solution reacted with calcium carbonate prepared by mixing and reacting aqueous hydrochloric acid solution having a hydrochloric acid concentration of more than 5 wt % and 10 wt % to 95 wt % of calcium carbonate to 100 ppm of fluoride ion contained wastewater.

* * * * *